United States Patent
Stroup et al.

(10) Patent No.: US 8,232,664 B2
(45) Date of Patent: Jul. 31, 2012

(54) VERTICAL AXIS WIND TURBINE

(75) Inventors: Mark R. Stroup, Longwood, FL (US); Luis Piloto, Johnson City, TN (US)

(73) Assignees: Mark R. Stroup, Longwood, FL (US); Luis Piloto, Johnson City, NJ (US)

( * ) Notice: Subject to any disclaimer, the term of this patent is extended or adjusted under 35 U.S.C. 154(b) by 421 days.

(21) Appl. No.: 12/461,837

(22) Filed: Aug. 25, 2009

(65) Prior Publication Data

US 2010/0045039 A1    Feb. 25, 2010

Related U.S. Application Data

(60) Provisional application No. 61/189,975, filed on Aug. 25, 2008.

(51) Int. Cl.
    *F03D 9/00*      (2006.01)
    *H02P 9/04*      (2006.01)
    *F03D 7/00*      (2006.01)

(52) U.S. Cl. .............................. 290/55; 290/44; 415/4.2

(58) Field of Classification Search .................... 290/44, 290/55; 415/4.2
See application file for complete search history.

(56) References Cited

U.S. PATENT DOCUMENTS

| | | | |
|---|---|---|---|
| 127,771 A * | 6/1872 | Hosey | 415/4.2 |
| 177,597 A * | 5/1876 | Ward | 415/4.2 |
| 250,806 A * | 12/1881 | Hamel | 415/4.2 |
| 356,145 A * | 1/1887 | McKenzie | 415/4.2 |
| 570,123 A * | 10/1896 | Clinton | 415/164 |
| 772,786 A * | 10/1904 | Clifford | 415/4.2 |
| 1,382,591 A * | 6/1921 | Ackermann | 415/4.2 |
| 4,031,405 A * | 6/1977 | Asperger | 290/55 |
| 4,039,849 A * | 8/1977 | Mater et al. | 290/55 |
| 4,132,282 A * | 1/1979 | Sparks | 180/2.2 |
| 4,318,019 A | 3/1982 | Teasley et al. | 310/156.35 |
| 4,365,929 A * | 12/1982 | Retz | 415/53.1 |
| 4,546,264 A * | 10/1985 | Pinson | 290/54 |
| 4,551,631 A * | 11/1985 | Trigilio | 290/55 |
| 4,571,152 A * | 2/1986 | Tatar | 415/4.2 |
| 4,725,194 A * | 2/1988 | Bartsch | 415/4.2 |
| 4,834,610 A * | 5/1989 | Bond, III | 415/53.3 |
| 5,126,584 A | 6/1992 | Ouellet | 290/55 |
| 5,380,149 A | 1/1995 | Valsamidis | 415/2.1 |
| 5,391,926 A * | 2/1995 | Staley et al. | 290/55 |
| 5,503,530 A * | 4/1996 | Walters | 416/197 A |
| 5,632,599 A | 5/1997 | Townsend | 416/42 |
| 6,015,258 A | 1/2000 | Taylor | 415/4.4 |
| 6,091,161 A * | 7/2000 | Dehlsen et al. | 290/43 |
| 6,425,205 B2 * | 7/2002 | Wygle et al. | 49/349 |
| 6,448,669 B1 | 9/2002 | Elder | 290/54 |
| 6,465,899 B2 | 10/2002 | Roberts | 290/44 |
| 6,740,989 B2 | 5/2004 | Rowe | 290/55 |
| 6,884,020 B2 * | 4/2005 | Kaare et al. | 415/1 |
| 6,962,478 B2 | 11/2005 | Tsipov | 415/4.2 |
| 6,984,899 B1 | 1/2006 | Rice | 290/44 |
| 7,094,017 B2 * | 8/2006 | Kurita | 415/4.2 |
| 7,235,893 B2 * | 6/2007 | Platt | 290/54 |
| 7,242,108 B1 * | 7/2007 | Dablo | 290/55 |
| 7,417,334 B2 | 8/2008 | Uchiyama | 290/55 |
| 7,633,177 B2 * | 12/2009 | Platt | 290/54 |

(Continued)

*Primary Examiner* — Pedro J Cuevas
(74) *Attorney, Agent, or Firm* — William M. Hobby, III

(57) ABSTRACT

This invention is for a vertical axis wind turbine apparatus supported in a tower with wind diverter doors for controlling the air impinging on the turbine blades. The diverter doors are closable in high wind conditions to seal off the wind turbine to protect the turbine against damage.

8 Claims, 6 Drawing Sheets

U.S. PATENT DOCUMENTS

| | | | |
|---|---|---|---|
| 7,847,428 B2 * | 12/2010 | Platt | 290/54 |
| 7,880,323 B2 * | 2/2011 | Menges | 290/55 |
| 7,922,450 B2 * | 4/2011 | Narasimalu | 416/23 |
| 7,946,802 B1 * | 5/2011 | Iskrenovic | 415/4.2 |
| 8,072,091 B2 * | 12/2011 | Wilson et al. | 290/55 |
| 2001/0054257 A1 * | 12/2001 | Wygle et al. | 49/349 |
| 2003/0231951 A1 * | 12/2003 | Kaare et al. | 415/4.2 |
| 2008/0131281 A1 | 6/2008 | Kariya | 416/183 |
| 2008/0217925 A1 * | 9/2008 | Boone et al. | 290/55 |
| 2009/0097960 A1 | 4/2009 | Williams | 415/4.2 |
| 2009/0167027 A1 | 7/2009 | Kato | 290/55 |
| 2009/0220339 A1 * | 9/2009 | Wu et al. | 416/1 |
| 2010/0247314 A1 * | 9/2010 | Narasimalu | 416/146 R |
| 2011/0280707 A1 * | 11/2011 | Iskrenovic | 415/4.2 |

* cited by examiner

VERTICAL AXIS WIND TURBINE

This application claims the benefit of U.S. Provisional Application No. 61/189,975, filed Aug. 25, 2008.

FIELD OF THE INVENTION

This invention is for a vertical axis wind turbine supported in a tower with wind diverter doors for controlling the air impinging on the turbine blades. The diverted doors are closable in high wind conditions to protect the turbine against damage.

BACKGROUND OF THE INVENTION

Wind turbines are generally classified into two groups based upon the orientation of the turbine axis of rotation. There are horizontal axis wind turbines and vertical axis wind turbines. Horizontal wind turbines are the traditional image when thinking of windmills. The rotor shaft and an electric generator are generally mounted atop a tower and are connected to a gear box that converts the slow rotation of the blades into a faster rotation for the electric generator. Horizontal axis wind turbines have the disadvantages of needing to be readjusted to face the wind with every shift of the wind direction and requires gearing, braking and feathering controls to transfer the torque to an off-axis generator and means to keep the rotational speeds within acceptable limits. These turbines are equipped with high wind shutdown features to avoid over speed damage. Vertical axis wind turbines, on the other hand, have blades mounted to a vertically extending rotor shaft and are favored in areas where winds constantly shift direction because the blades are not required to be rotated to face into the wind and where low winds occur because they require a slower wind speed to start generating electricity.

Each group of wind turbines has advantages and disadvantages. The main disadvantage of vertical axis wind turbines is drag created as the blades rotate into the wind even while a lift is being created on the opposite side. The turbulent winds located near the ground can cause excessive noise as well as torque and strain on the main rotor shaft and bearings. Other disadvantages are that they have only about half the efficiency of the horizontal axis wind turbines in large part because of the additional drag that they have as the blades rotate in to the wind.

The present invention overcomes disadvantages of vertical axis wind turbines by utilizing a tower configuration in which the wind driven blades and turbine are inside a tower frame. The tower frame has diverter doors that reduce the draft of the blades as they rotate into the wind. The doors transfer the load of the blades to the tower and off the axis. This increases bearing life and ease in maintenance and repairs. Diverter doors also control the quantity of wind to the blades and therefore can increase wind to the blades in low wind conditions and will decrease wind in high wind conditions using computer control motors on the diverter doors. The tower configuration with the diverter doors, which can be fully closed, allows for greater protection against high wind conditions. The tower configuration with diverted doors allows the vertical axis wind turbine to be configured for a multi-megawatt generation and allows the turbines blades, which can increase torque and allow for a gear box ratio to increase the speed of the generator. In addition, the increased torque and weight transfer of the axis to the tower allows the axis to be fitted with a fly wheel which limits over torque from gusts of wind and allows continuous electrical generation during lull periods. The rigid tower and diverter doors allow the wind turbine to be used in hurricanes and other high wind conditions by closing the diverter doors and the rigid frame.

The present wind turbine can be installed in a city or urban environment and allows for ease in connection to an electrical grid and the transfer of electricity to the consumer.

In the past, there have been a wide variety of vertical axis wind generators including the following U.S. patents. The Rice U.S. Pat. No. 6,984,899 is a vertical axis windmill for the generation of electric power utilizing wind which maintains a relatively constant rotational frequency of the shaft of the windmill. It uses two wind foils which extend radially outward from the blades to provide a scoop for pulling in more air than would normally be received by the blades. The wind foils direct the flow to the power producing part of rotation of the blades and close to control the wind flow to the blades.

The Elder U.S. Pat. No. 6,448,669 is for a vertical axis water turbine used to convert water kinetic energy into mechanical energy. A vertical axis wind turbine is mounted so that wind is compressed and directed to the rotor blades by a plurality of fixed stator blades. The Kato U.S. Patent Application Publication No. US 2009/0167027 is for a blade for a windmill and a windmill and wind power generator of the vertical axis type. The Tsipov U.S. Pat. No. 6,962,478 is for a vertical axis windmill having a wind turbine mounted inside a frame. A plurality of gate elements which are turnably connected to the frame are for the closing and opening of the openings in the frame by wind flowing substantially in a horizontal plane. The Williams U.S. Patent Application Publication No. 2009/0097960 is for a vertical axis windmill assembly.

The Kariya U.S. Patent Application Publication No. 2008/0131281 is for a vertical axis windmill with a guiding device which includes vertical plates which are fixed on the bottom of the base structure to the top of the rotor in an annular array. The Uchiyama U.S. Pat. No. 7,417,334 is for a wind power generation system which uses a permanent magnets and coils for generating electric power.

The Valsamidis U.S. Pat. No. 5,380,149 is for a wind turbine cross wind machine which has a circumferential arrangement of guide vanes around a centrally located rotor and having an arrangement of turbine blades in the middle so that the guide vanes can guide the wind falling upon a counteracting rotor blades towards the direction of rotor rotation.

The Taylor U.S. Pat. No. 6,015,258 and the Teasley et al. U.S. Pat. No. 4,318,019, and the Townsend U.S. Pat. No. 5,632,599 each teach wind turbine rotor blade designs.

The Rowe U.S. Pat. No. 6,740,989 is for a vertical axis wind turbine which has vanes surrounding a turbine rotor with each vane creating a turbulent swirling boundary layer on the vane surface that rotates in the direction that draws and redirects air flow into the air flow channels defined by the stator vanes. It is then compressed by the narrowing of the channels and directed to rotor blades to drive the turbine.

The Roberts U.S. Pat. No. 6,465,899 is for an omni-directional vertical-axis wind turbine. The Ouellet U.S. Pat. No. 5,126,584 is for a windmill having a stator and a rotor. The stator surrounds and supports the rotor and has equally spaced vanes having a stationary shutter surrounding a movable inner shutter capable of pivoting around the longitudinal axis.

The present invention is for a vertical axis wind turbine for generating electricity which has a vertically extending wind turbine having its rotor shaft connected through a gear box to an electric generator and which has a plurality of diverter doors which are movable to control the air flow to and from the wind turbine which doors are closable to protect the wind turbine to protect against winds exceeding a predetermined velocity.

SUMMARY OF THE INVENTION

A vertical axis wind turbine for generating electricity has a tower base having a tower frame attached thereto and a vertically extending wind turbine mounted in the tower frame. The wind turbine has a central shaft and a plurality of wind turbine vanes and has the shaft attached to an electric generator through a gear box for producing electricity by the rotation of the turbine. A plurality of diverter doors are movably attached to the tower frame adjacent the wind turbine and are movable to control the air flow to and from the wind turbine from any direction. The diverted doors are fully closable to block air flow to the wind turbine from winds exceeding a predetermined velocity so that a vertical standing wind turbine generates a controlled electrical output while being protected during storms and very high winds by the movement of a plurality diverted doors. The wind turbine tower frame has a wind force and direction sensor attached thereto operatively connected to a computer control circuit for controlling the movement of the diverted doors. Each diverter door has a support arm hinged to the tower frame for rotation and each arm is attached to a curved gear rack driven by a meshed pinion gear to rotate each diverter door. Each pinion gear is coupled to an electric motor which rotates the pinion gear to move the curved gear rack to rotate the diverter door and each gear motor is coupled to a control circuit for opening and closing each diverter door responsive to wind force and direction sensor.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
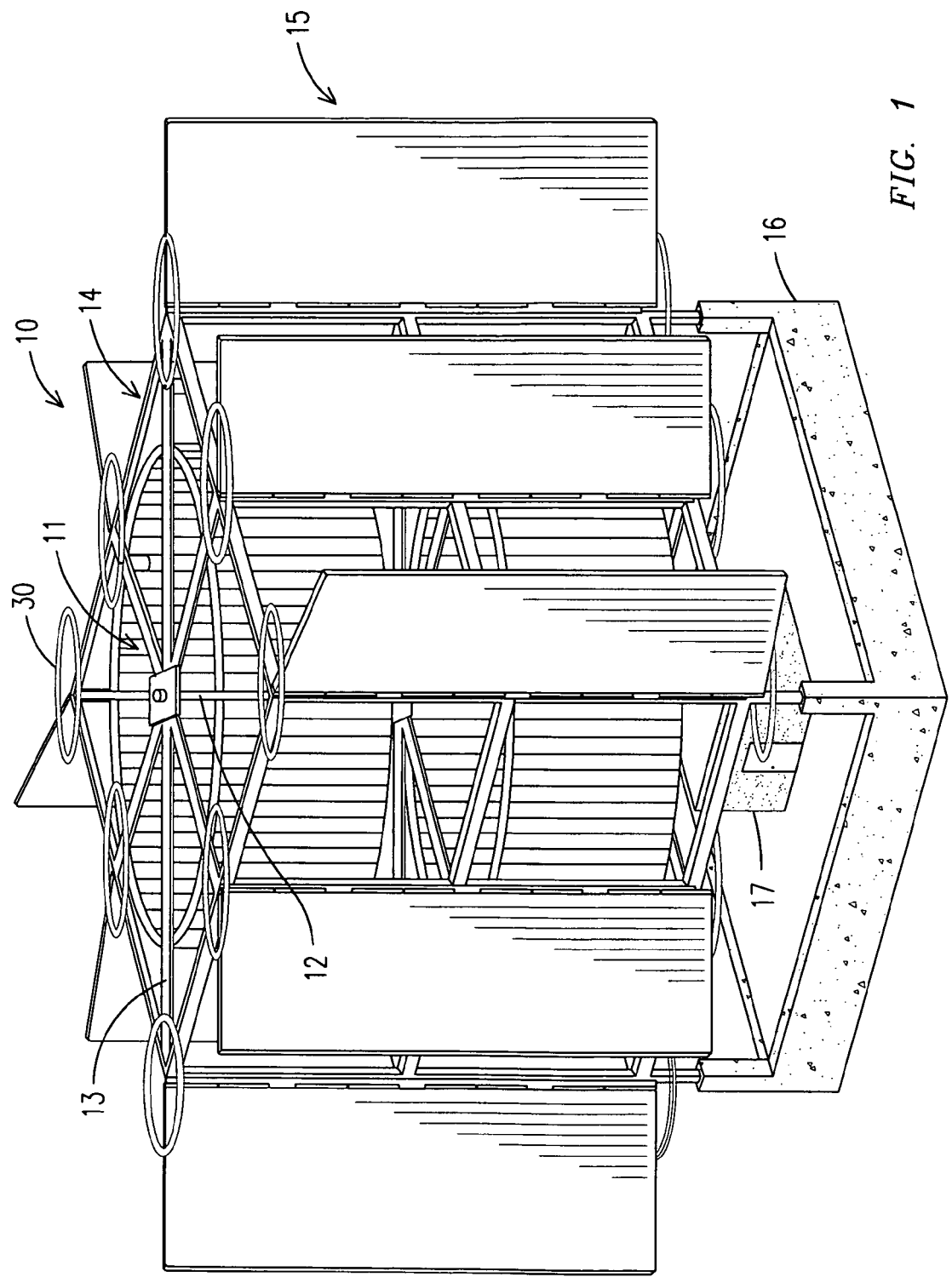
FIG. 1 is a perspective view of a vertical axis wind turbine in accordance with the present invention.
Figure 2:
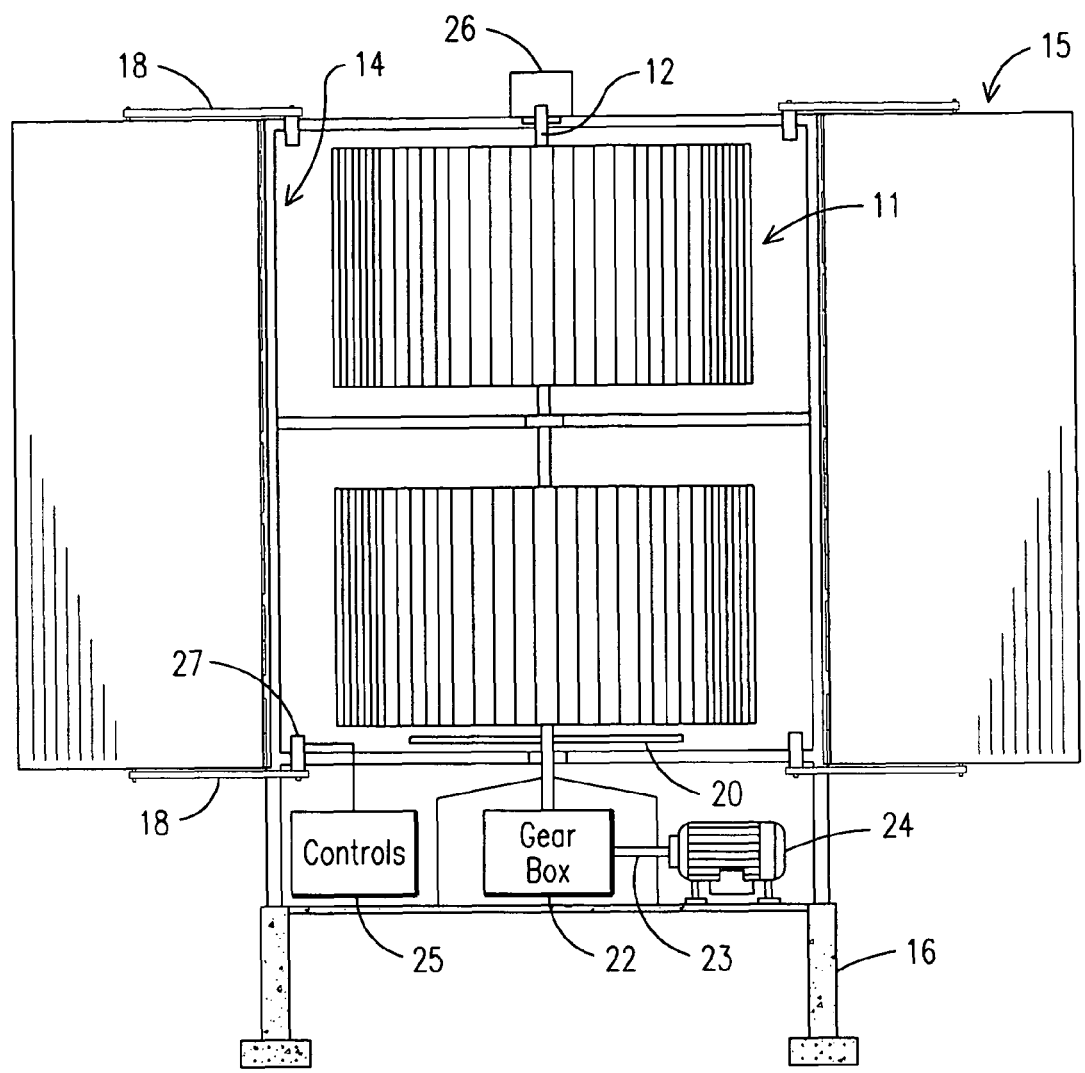
FIG. 2 is a sectional diagrammatic view of the wind turbine of FIG. 1.
Figures 6, 7:
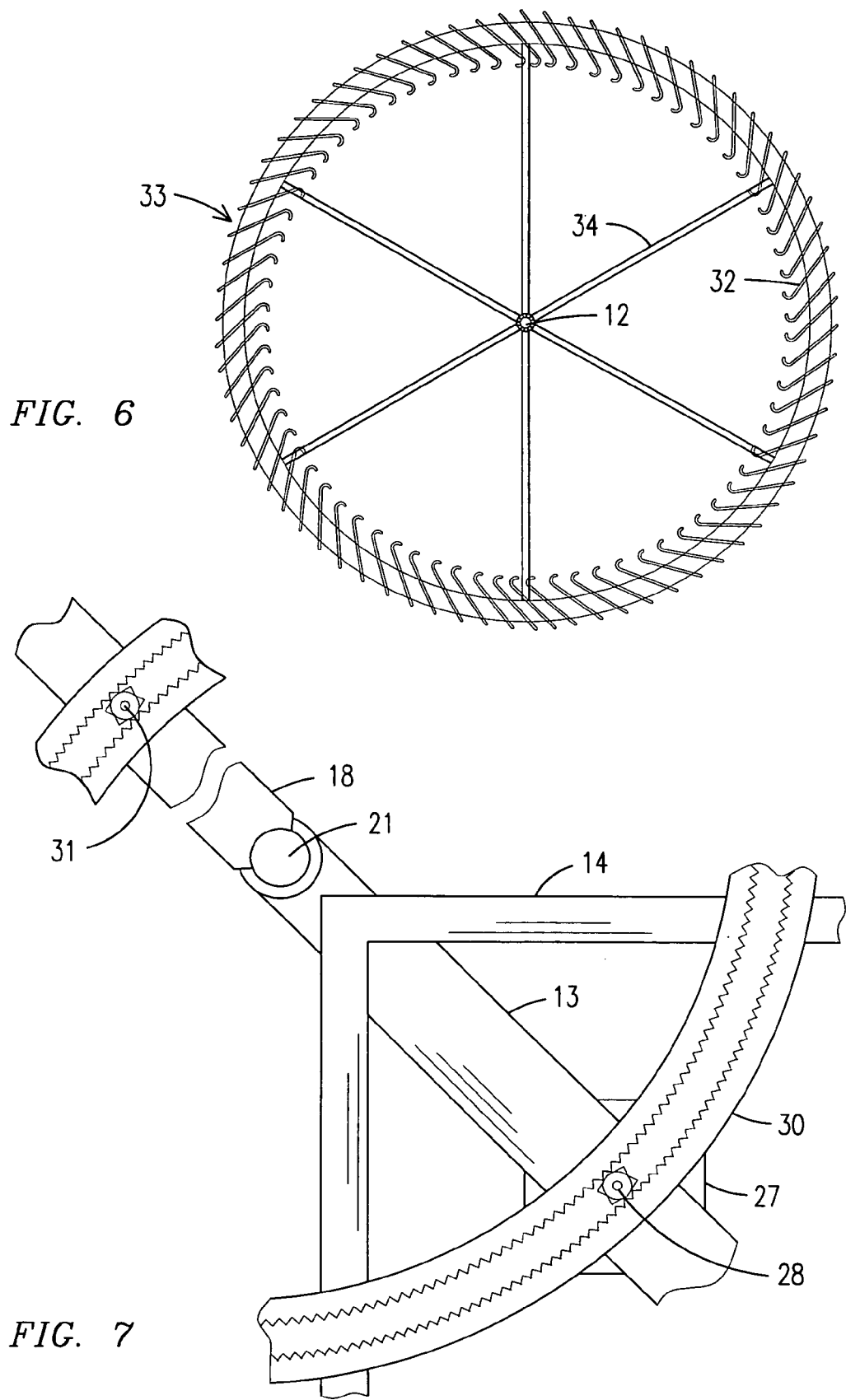
FIG. 6 is a sectional view of the turbine blade portion of the wind turbine of FIGS. 1 and 2.
FIG. 7 is a partial sectional view of the diverted door gear rack and pinion gear.

A vertical axis wind turbine 10 is illustrated in FIGS. 1 and 2 having a plurality of turbine blades or vanes mounted to a central rotary shaft 12. The wind turbine 11 has a plurality of turbine blades 13 and is supported in a vertically extending tower frame 14. The tower frame 14 has eight vertically attached diverter doors 15 hingedly attached to the vertically extending frame 14. The vertically extending tower frame 14 is fixedly attached to a base 16 which has a control housing 17 mounted thereon. Each diverter door 15 can be rotated through a 180 degree range of motion. Each diverter arm 15 has upper and lower support arms 18 which rotate on hinges 21. The wind turbine 11 rotary shaft 12 is connected to a gear box 22 which in turn is connected through a shaft 23 to an electrical generator 24 located in the housing 17. The turbine shaft 12 has a weighted flywheel 20 attached thereto to limit over torque from wind gusts and to allow continuous electrical generation during short lolls in the wind. Housing 17 also has the computer control circuit 25 therein which is connected to a wind direction and forced sensor 26. The central circuit 25 is connected to each of the diverter door electric motors 27. Each diverter door electric motor 27 is attached to the frame 14 and, as seen in FIG. 7, rotates a pinion gear 28 which is meshed with a curved or circular gear rack 30. A gear rack 30 is attached to each diverter door support arm 18 which is hinged with the hinges 21 to the tower frame 14. Each diverter door 15 support arm 18 is attached to the circular gear rack 30 with a pin 31 so that rotating the pinion gear 28 with the electric motor 27 will rotate the circular gear rack 30 to rotate the support arm 18 and diverter door 15.

Figure 4:
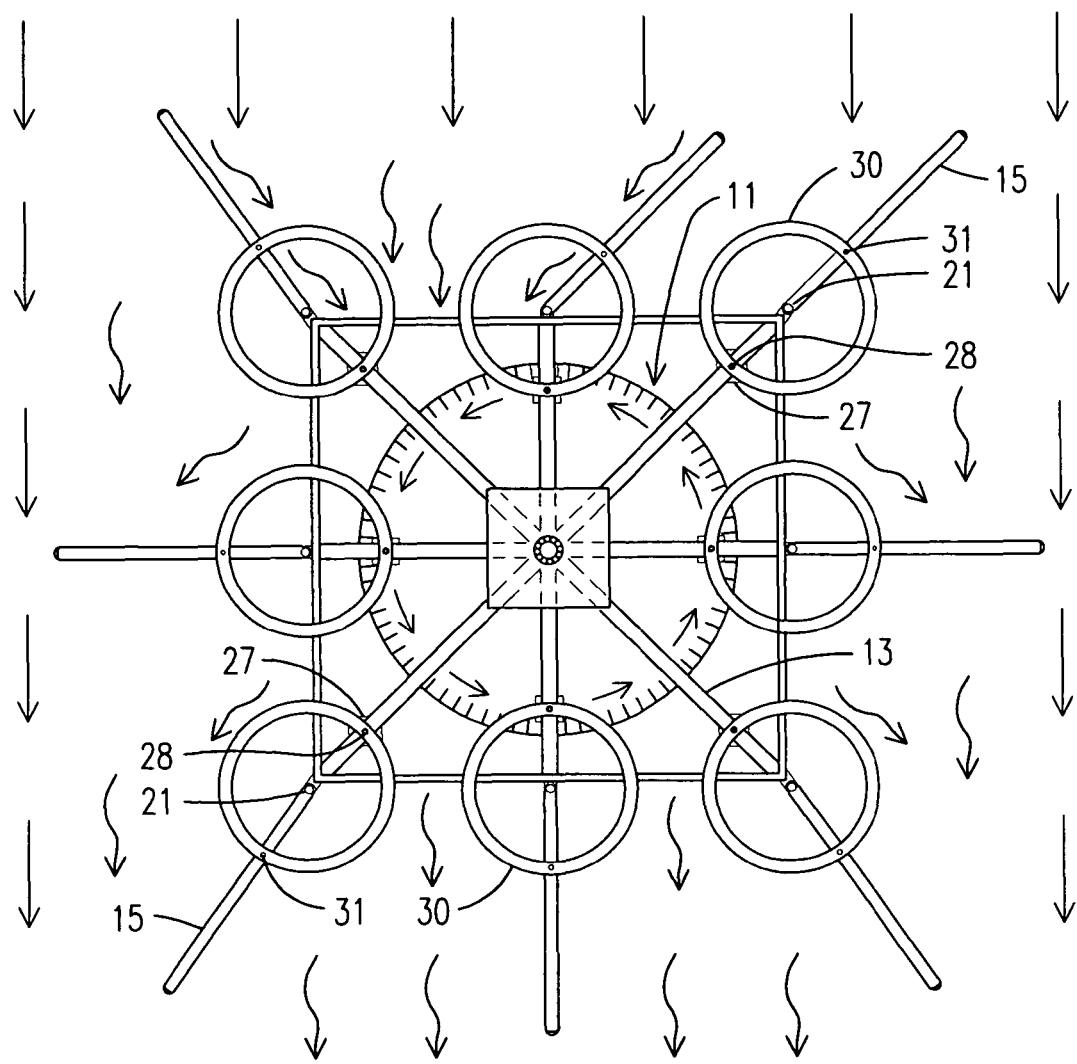
FIG. 4 is a sectional diagrammatic view in accordance with FIG. 3 in which one diverter door has been shifted to direct the wind coming into the wind turbine.
Figure 5:
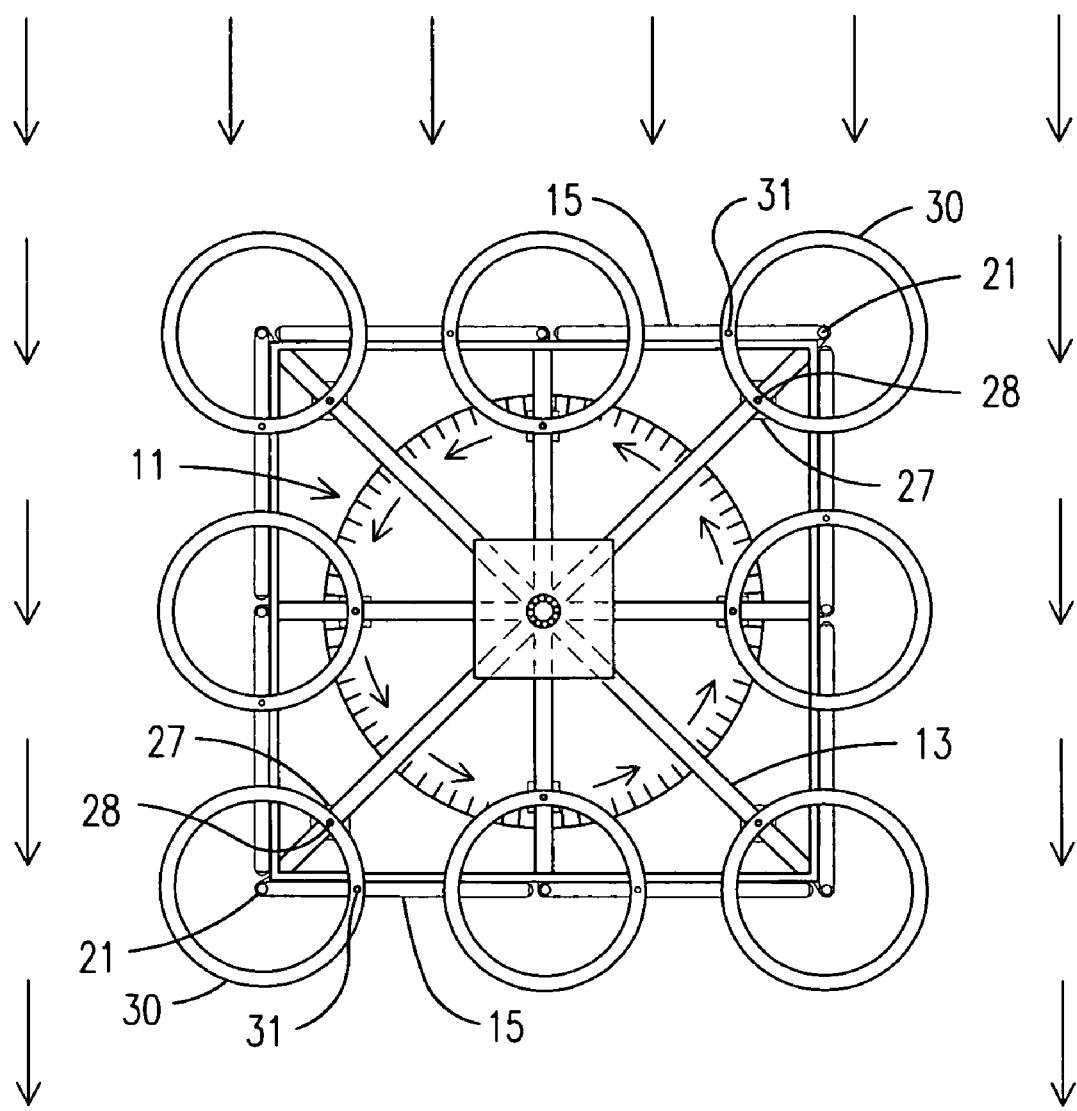
FIG. 5 is a sectional diagrammatic view of the wind turbine of FIGS. 3 and 4 having all the diverter doors closed.

In operation, the wind sensor 26 provides data to the motor control 25 which controls the electric motors 27 to move the diverter doors 15. When the wind exceeds a predetermined force, motors 27 drive the pinion gears 28 and racks 30 to close the diverter doors 15 to a position flat with the tower frame 14 to close off the tower frame to enclose the wind turbine 11, as shown in FIG. 5. The diverter doors 15 also function to increase the speed of rotation of the turbine 11 by reducing the drag and turbulence which occurs on the backside of the turbine blades. Lift is created when the wind pushes off the turbine blades and a low pressure system builds on the backside, or non-wind side, of the blades. The two front diverter doors 15 are angled, for example, at 45 degrees from the direction of the wind, as seen in FIG. 4, as pressures builds up on the backside of the vanes while increased wind speed occurs on the flipside of the vanes to increase the lift and the torque generated on the main turbine shaft 12.

Figure 3:
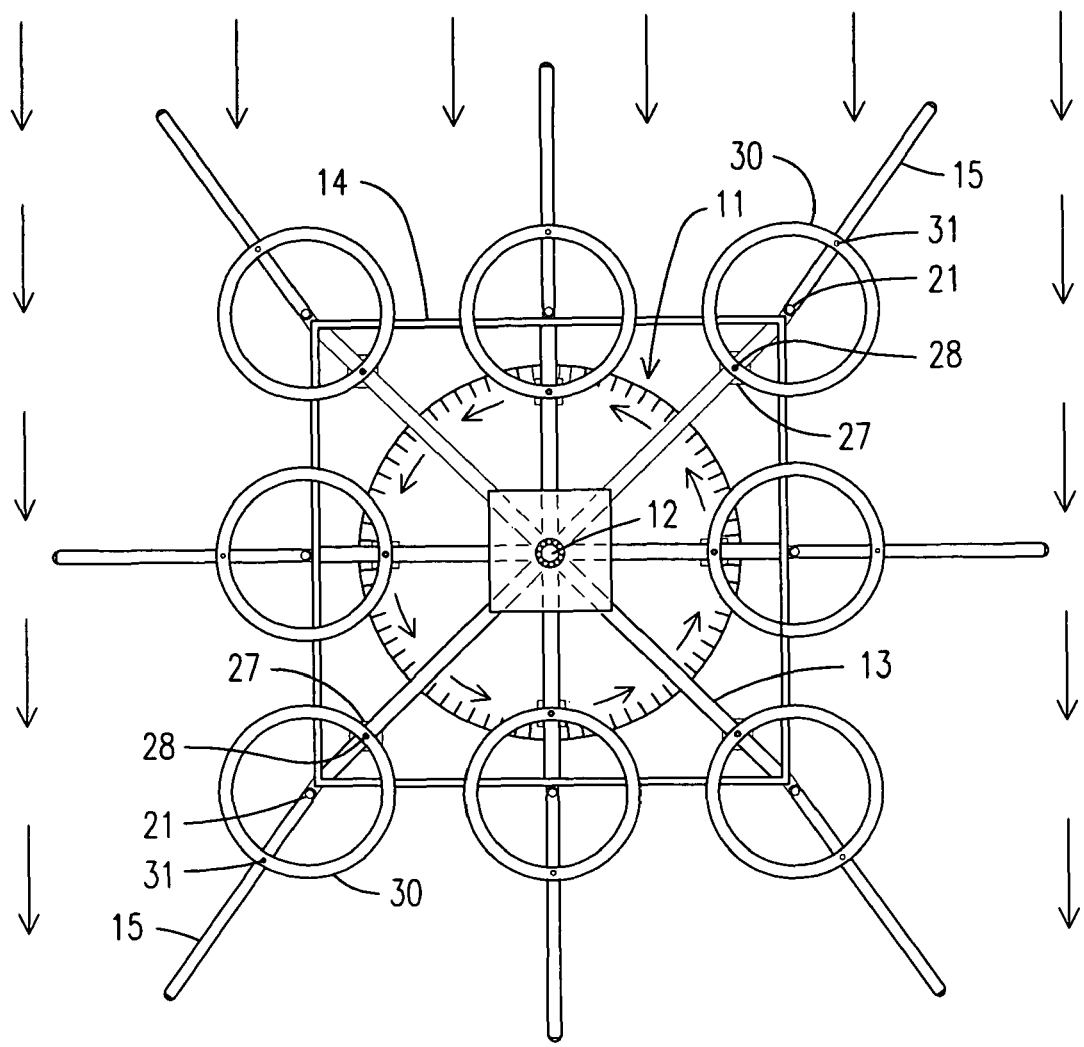
FIG. 3 is a top diagrammatic view of the operation of the wind turbine of FIGS. 1 and 2 having each diverter door opened to extend radially from the center axis.

The diverter doors 15 can also be positioned, as in FIG. 3, to face the oncoming wind. The tower frame 14 has diverter doors 15 positioned for movement to reduce drag and air pressure of wind that is within the turbine blades before the wind egresses out the back of the turbine. As the blades rotate counterclockwise, as shown in FIG. 3, the wind is released out the back of a traditional vertical axis wind turbine.

The enclosed wind turbine of the present invention can use a wide variety of turbine blades but a watermill design as used in watermills has been found to generate a large amount of torque. The turbine blades can be made of any diameter desired but are made of a lighter material.

A disadvantage of vertical axis wind turbines is that when a lift is created on one side of the device, drag is created on the opposing side because the wind is blowing on both sides of the device. This problem has been addressed in the past by feathering the foils or vanes on one side and supporting them on the other side which causes an unbalanced load. The present diverter doors 15 are designed to reduce the drag forces from the turbine blades and transferring it to the tower diverter doors 15.

The present wind turbine uses a gearbox 22 between the turbine shaft 12 and the electrical generator 24. This allows the relatively slow rotation and high torque power of the waterwheel type blades to be converted to a high speed low torque power running generator. A gear ratio of 20/1 or higher may be used with the present wind turbine while allowing sufficient torque to generate a large electric generator.

Waterwheel design type turbine blades 22 can be seen in FIG. 6 mounted to a turbine frame 33 attached to turbine support arms 34.

It should be clear at this point that a vertical axis wind turbine has been shown which has diverter doors controlling the air impinging on the turbine blades and in which the diverter doors are closable in high wind conditions to protect the turbine against damage. However, the present invention is not to be construed as limited to the forms shown which are to be considered illustrative rather than restrictive.

We claim:

1. A vertical axis wind turbine for generating electricity comprising:
    a tower base;
    a tower frame attached to said base;
    a vertically extending wind turbine mounted in said tower frame and having a central shaft and a plurality of wind blades attached thereto, said shaft being attached to an electric generator for producing electricity therefrom upon rotation of said shaft;
    a plurality of diverter doors, each diverter door being movably connected to said tower frame adjacent said wind turbine, said plurality of diverter doors being movable to seal said wind turbine in a housing formed by said plurality of diverter doors when winds exceed a predetermined velocity; and
    a plurality of electric motors, one said electric motor being coupled to each said diverter door to variably position the coupled diverter door relative to each other diverter door for controlling air flow to said wind turbine, whereby a vertical standing wind turbine generates a controlled electrical output while controlling air flow to said wind turbine and being protected against storms by the individual movement of each of a plurality of diverter doors.

2. The wind turbine in accordance with claim 1 in which said wind turbine tower frame has a force and wind direction sensor attached thereto.

3. The wind turbine in accordance with claim 2 in which each said diverter door has a support arm hinged to said tower frame for rotation thereon.

4. The wind turbine in accordance with claim 3 in which each said diverter door support arm is attached to a curved gear rack driven by a meshed pinion gear coupled to one said electric motor to rotate said diverter door.

5. The wind turbine in accordance with claim 4 in which each said electric motor is coupled to a control circuit for opening and closing one said diverter door responsive to said wind force and direction sensor.

6. The wind turbine in accordance with claim 5 including a gear box coupled between said wind turbine shaft and said electric generator.

7. The wind turbine in accordance with claim 6 in which each said diverter door has a second support arm extending parallel to said support arm and hinged to said tower frame.

8. The wind turbine in accordance with claim 7 having a weighted flywheel attached to said central shaft.

* * * * *